United States Patent [19]

Hurlow

[11] Patent Number: 4,483,211

[45] Date of Patent: Nov. 20, 1984

[54] DUAL CABLE TRANSMISSION GEARSHIFT MECHANISM

[75] Inventor: Robert H. Hurlow, Bainbridge Island, Wash.

[73] Assignee: Cablecraft, Inc., Tacoma, Wash.

[21] Appl. No.: 340,537

[22] Filed: Jan. 19, 1982

[51] Int. Cl.³ .................. F16C 1/12; G05G 7/10; G05G 9/16
[52] U.S. Cl. .................... 74/473 R; 74/501 R
[58] Field of Search .......... 74/473 R, 473 SW, 491, 74/501 R

[56] References Cited

U.S. PATENT DOCUMENTS

| | | | |
|---|---|---|---|
| 1,635,483 | 7/1927 | Kesling | 74/473 R |
| 2,280,047 | 4/1942 | Nampa | 74/473 R |
| 2,497,930 | 2/1950 | Creson | 74/473 SW |
| 2,547,317 | 4/1951 | Gustafson | 74/473 R |
| 3,541,877 | 11/1970 | Houk | 74/471 |
| 3,604,284 | 9/1971 | Houk | 74/791 |
| 3,611,827 | 10/1971 | Bottum | 74/471 |
| 3,620,096 | 11/1971 | Scolari | 74/469 |
| 3,831,633 | 8/1974 | Comer | 74/471 |
| 4,152,950 | 5/1979 | Langford | 74/471 |
| 4,270,403 | 6/1981 | West | 74/473 |

FOREIGN PATENT DOCUMENTS 2317667.2 10/1973 Fed. Rep. of Germany.
455260 5/1949 France .................. 74/473 R

*Primary Examiner*—Allan D. Herrmann
*Attorney, Agent, or Firm*—Christensen, O'Connor, Johnson & Kindness

[57] ABSTRACT

A dual push-pull cable controlled remote gearshift mechanism in which a control shaft is rocked about one axis to swing one cable actuator member and is rocked about a second axis transverse to the first to swing a second cable actuator member, with the coupling between the first cable and the first actuator member being substantially aligned with the transverse axis and offset from the longitudinal axis, and with the operating connection between the second actuator member and the second cable being substantially aligned with the longitudinal axis of the control shaft and offset from the transverse axis thereof. In the receiver unit, first and second coaxially interengaged shifter members are coupled to the respective cables through lever-type actuated members, one through a form of coupling that shifts one such shifter member axially in relation to the other, and the other coupling being such as to rotate the shifter members conjointly through the first shifter member in any of its axially shifted positions.

7 Claims, 9 Drawing Figures

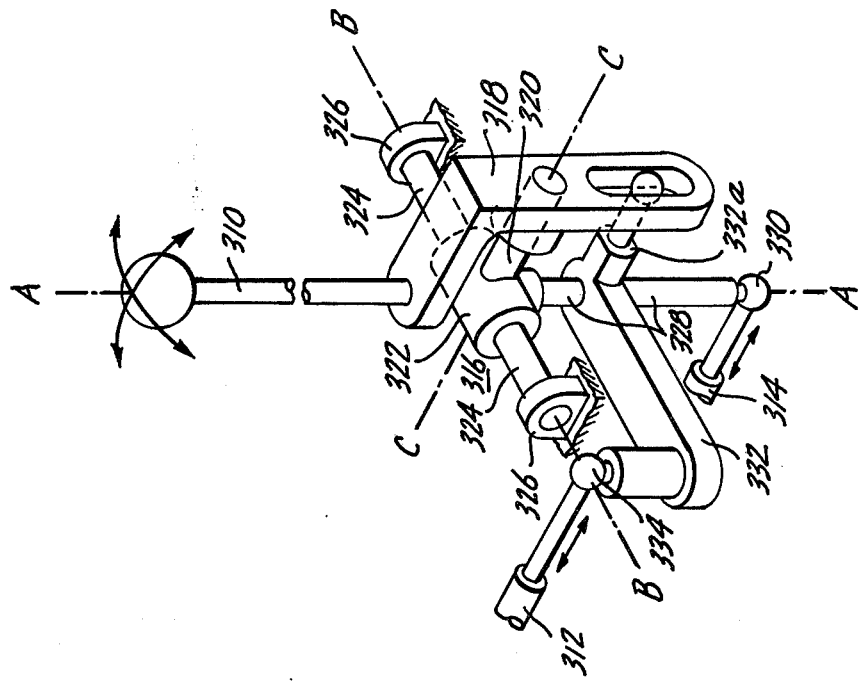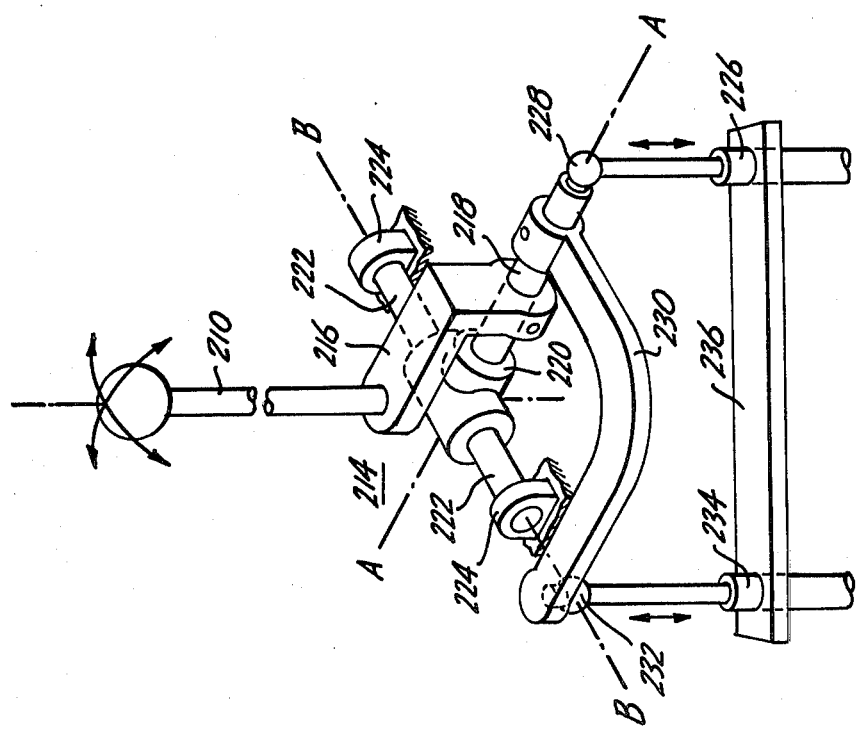

DUAL CABLE TRANSMISSION GEARSHIFT MECHANISM

BACKGROUND OF THE INVENTION

This invention relates to improvements in remotely controlled actuator mechanisms requiring two modes of motion and, more particularly, concerns an improved push-pull cable transmitter-receiver system for shifting gears in a vehicle transmission by operation of a gearshift lever remotely in the cab of the vehicle. The invention is herein illustratively described by reference to its preferred embodiment so applied; however, it will be recognized that certain modifications and changes with respect to details may be made without departing from the essential features involved.

In the use of flexible, coaxial push-pull cables to operate mechanisms by remote control, cable friction and backlash (i.e., lost motion) are important factors as is directness in the maximum utilization of available forces in producing motion under load in the receiver unit in response to forced motion of a control member in the transmitter unit. Where two modes of motion are required, as in the case of a vehicle transmission gearshifter mechanism, a minimum of two cables is necessary for the task. An object of this invention is to provide a system of mechanical remote control in which each mode of remote control motion is produced by one of the cables while the other cable remains substantially stationary, thereby reducing both friction and backlash, in contrast to prior art systems that function through both cables simultaneously actuated and wherein friction and backlash are cumulative from both cables. A related object is to achieve the foregoing objective by transmitter and receiver mechanical units that are simple, efficient, durable and direct in the conversion between cable member motion and transmitter control member motion and receiver controlled member motion, respectively.

SUMMARY OF THE INVENTION

In accordance with this invention, a transmitter unit control member preferably in the form of a shaft is guided for motion in a first mode, which in the preferred embodiment comprises revolving of the shaft about its longitudinal axis, so as to move a crank arm through an angular range and thereby to produce longitudinal displacement of one of the push-pull cables through a coupling of such cable to the crank arm at a location substantially on an axis transverse to the shaft axis and also transverse to the direction of extent of the push-pull cable member. In addition, the transmitter control member, again preferably a revolvable shaft, is further guided for rocking motion about said transverse axis to operate a second crank arm preferably constituting a longitudinal extension of the shaft and which is coupled to the movable member of the second coaxial cable at a location offset from said transverse axis and substantially in alignment with the shaft in a direction transverse to the extent of the second cable member. In other embodiments illustrated herein, the transmitter unit control member is mounted to rock or swing in mutually transverse planes, without requiring it to revolve on its own axis.

In its application to a remote control gearshift mechanism for a cab-over engine truck as herein illustrated, the shaft comprising the transmitter unit control member has an upward extension (i.e. gearshift lever) which is angled in relation to the shaft axis to a manual handgrip on its upper end which is radially offset from such axis as a means to revolve the shaft and thereby select the line of gears or gear rail in the transmission having the gear to be engaged. In this preferred embodiment, the second crank arm mentioned above comprises a downward extension of the pivotably and rotatably guided shaft which can be swung by operation of the manual gearshift lever in order to select a particular gear to be engaged in the transmission of the vehicle. In all embodiments, the push-pull cable members are operated singly in the respective modes of control member motion so as to minimize friction loading and backlash in the system.

These and other features, objects and advantages of the invention will become more fully evident as the description proceeds by reference to the accompanying drawings.

BRIEF DESCRIPTION OF THE DRAWINGS

FIG. 3 is a side elevation, partly in section, of the transmitter unit and cable couplings, while

FIG. 5 is a partially sectioned end elevation of the receiver unit, while

FIGS. 8 and 9 are simplified and, in a sense, schematic perspectives of two alternative embodiments of the transmitter or control member unit.

DETAILED DESCRIPTION WITH REFERENCE TO THE DRAWINGS

Figure 1:
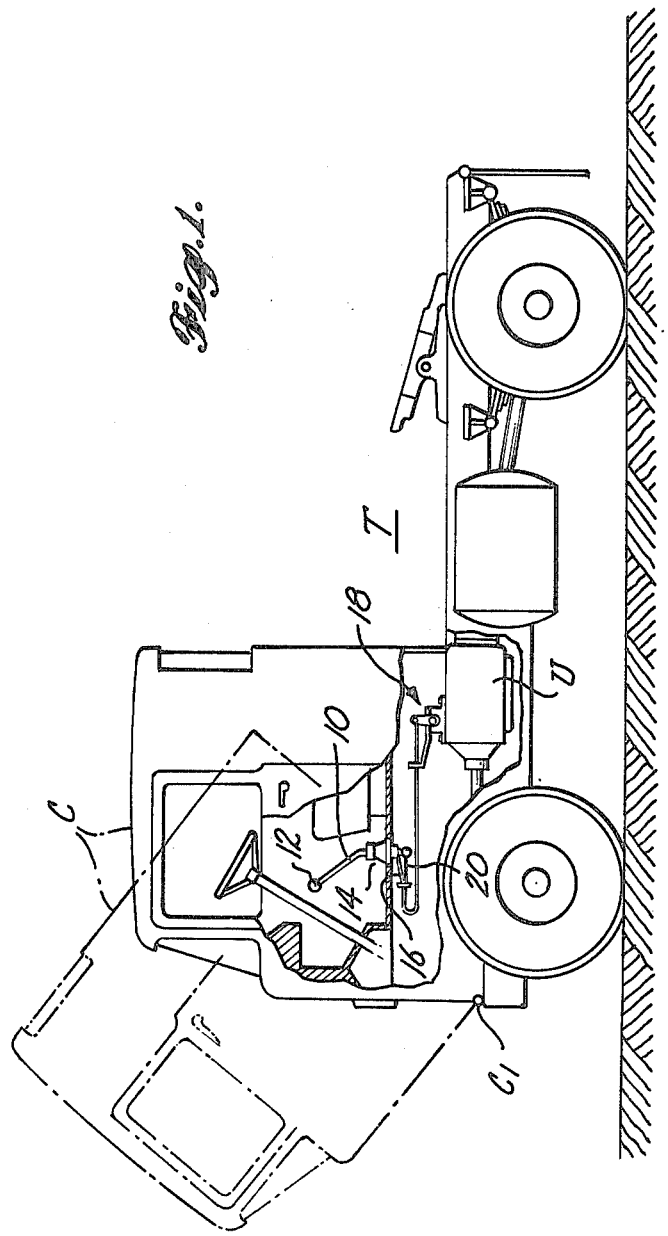
FIG. 1 is a simplified side view of a cab-over engine truck incorporating a manually operated remote transmission gearshifter mechanism of this invention.

FIG. 1 illustrates in outline form the general configuration of a cab-over engine truck T having a cab C that can be raised on a pivot $C_1$ into the dotted line position for gaining access to the underlying mechanical systems including the engine (not shown) and the transmission unit U. Within the cab of the truck is mounted, at the usual convenient location, a manual gearshift lever 10 with a hand knob 12 on its upper end, and with its lower end portion comprising a shaft 22 extending down into and through a floor-mounted transmitter unit 14. Shaft 22 has two modes of motion. In one, according to the preferred embodiment, the control lever 10 is swung transversely of the truck about the upright axis of shaft 22, and the movable central member of a coaxial push-pull cable 16 is actuated thereby to produce component motion in the receiver unit 18 so as to select one of the gear rails in the underlying transmission unit U. On the other hand, manual shifting of the operating lever 16 in the direction fore and aft of the vehicle rocks the shaft 22 about a transverse axis. This acts through a second push-pull cable 20 so as to produce component motion in the receiver unit 18 causing selective engagement of one of the drive gears in the transmission unit U associated with the gear rail first selected. The use of flexible push-pull coaxial cables avoids the necessity of mechanically connecting and disconnecting the gearshift transmitter unit in the truck cab with the receiver unit 18 on the drive transmission U each time the cab is raised and lowered, and it also permits truck design variations to be positionally accommodated by flexing of the cables.

With specific reference to the preferred form of transmitter unit 14, gearshift lever 10 in effect constitutes an upward angled extension of shaft 22 serving as the control member of the transmitter unit. Shaft 22 extends through a longitudinal bore in fitting 24 and is free to rotate therein about the shaft's upright longitudinal axis. Surrounding the shaft and resting against the top face of the fitting 22 is a stop collar 26 held beneath the retainer ring 28 swaged on the shaft. Also surrounding the shaft and bearing against the lower end face of the fitting 24 is a collar fitting 30 splined or keyed to the shaft so as to rotate conjointly with the shaft under load. Collar fitting 30 carries a laterally and upwardly projecting arm 32 for a purpose to be described. A stop collar 35 pinned on the lower end of the shaft holds the collar fitting 30 in place against longitudinal slippage. In addition to being mounted to revolve about an upright longitudinal axis within fitting 24, the shaft-like control member 22 is movable in a second mode, namely about a transverse axis defined by opposing, mutually aligned pivot pins 34 received and pinned in mutually aligned bores in the opposing bosses 36 of housing 38. The inner ends of the pivot pins are received in socket bores in opposite sides of the fitting 24. Housing 38 has a base flange or flanges 40 bolted, as shown, to the truck cab floor.

Projecting transversely and upwardly from fitting 30, arm 32 terminates in the ball element 42 of a ball-and-socket coupling. The complemental socket member 44 is carried by slide rod 46 of cable 16 terminal assembly 48. The arm 32 in its neutral or mid-range position locates the ball 42 substantially on the transverse axis of pivot pins 34 at a location spaced radially outward from the upright axis of shaft 22. Terminal assembly 48 is anchored in the upper end of a mounting strap 50A secured by a line of bolts 50C to mounting bracket 50, oriented such that slide rod 46 extends substantially transversely to lever arm 32 in the latter's neutral position, as shown. Swinging of gearshift lever 10 about the upright axis of shaft 22 causes arm 32 and thereby ball fitting 42 to swing in an arc about the shaft axis both forwardly and rearwardly from the neutral position. As arm 32 is rocked one way or the other out of the neutral position, ball element 42 swings in an arc about the axis of shaft 22. The cable terminal assembly 46,48 bends laterally the slight amount necessary to accommodate this motion.

In similar manner, the ball element 54 on the lower end of shaft 22 is engaged by the complemental socket 56 on the end of slide rod 58 in the terminal assembly 80 of push-pull cable 20. This terminal assembly is mounted on the lower end of strap 50A mounted on bracket 50, oriented such that slide rod 58 extends and retracts as the gearshift lever 10 is swung fore and aft of the truck chassis about the axis defined by pivot pins 34. Thus, the length of shaft 22 extending between the axis of pivot pins 34 and the ball fitting 54 constitutes a lever arm which is actuated by such swinging of the gearshift lever 10 about the axis of pins 34 so as to actuate the movable member of push-pull cable 20.

It will be noted that with ball fitting 42 located at or in the immediate vicinity of the axis defined by pivot pins 34, actuation of push-pull cable 20 can occur without causing substantial movement or actuation of push-pull cable 16, and vice-versa. In other words, the cables are actuated independently of each other by operating the control lever 10 in one mode or the other as described.

As a matter of design preference, fitting 24 widens at the top into a crown 62 of arcuate form centered on the axis of pins 34 and serving as a closure for an arcuate slot 64 in the top panel of housing 38. A suitable protective cover or boot 66 of rubber-like material seals the floor-mounted mechanism of unit 14 without impeding motion of the gearshift lever 10 in either mode.

At the receiver unit 18, cable 16 has a terminal assembly 68 fixed on a mounting bracket 70 and carrying the variably extendable rod 72 that terminates in the socket fitting 74 of a ball-and-socket coupling. The ball fitting 76 of that coupling is mounted on the end of a crank arm 78 comprising a first actuated member of the receiver unit 18. Similarly, push-pull cable 20 has a terminal assembly 80 mounted on bracket 70 and having a slide rod 82 that terminates in a ball fitting 84 of a ball-and-socket joint. The ball 86 of that joint is mounted on the end of a crank arm 88 comprising the second actuated member of the receiver unit 18 which will now be more fully described.

Figure 7:
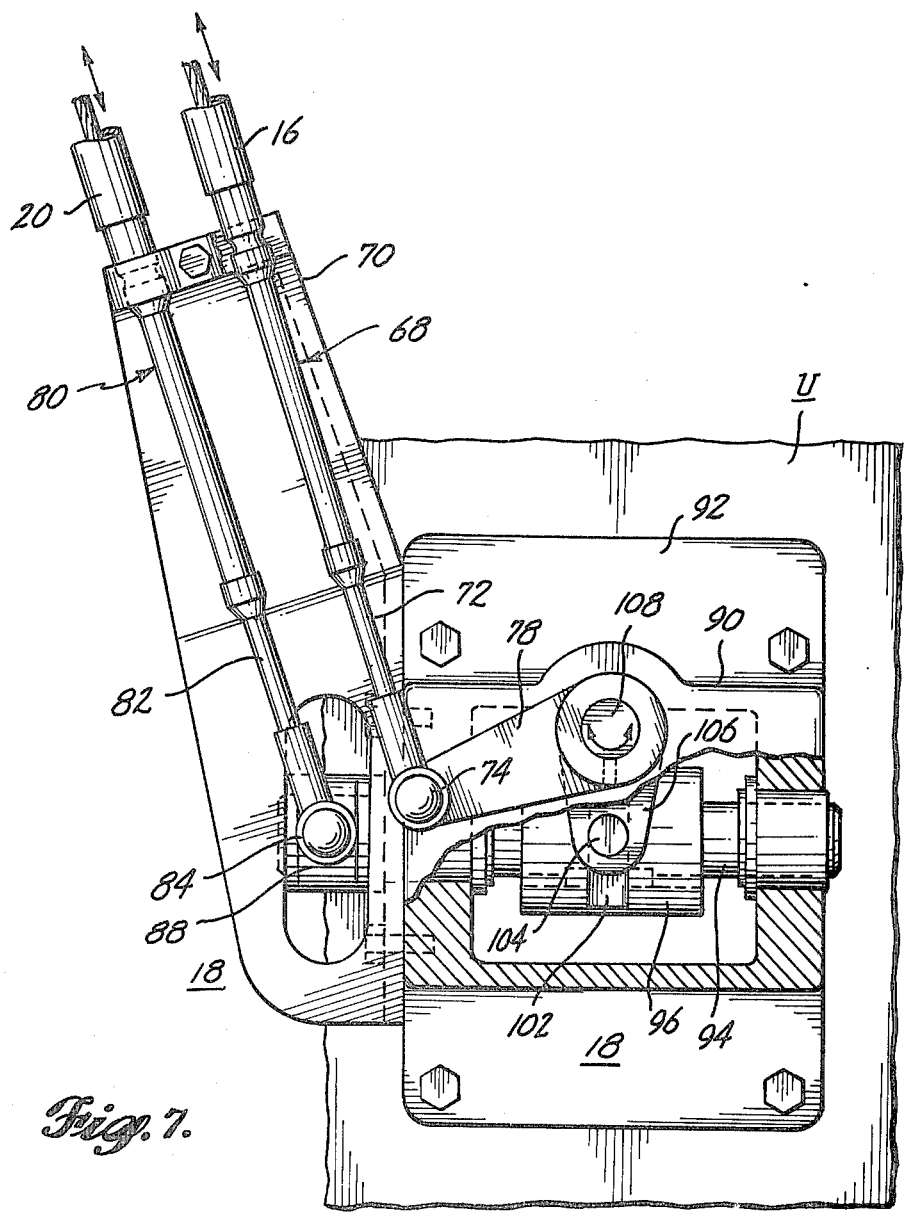
FIG. 7 is a top view thereof.

Receiver unit 18 in the illustrated form comprises a principal casting 90 having a base flange 92 adapted to be bolted to the top of the housing of truck transmission U in registry with the usual operating access opening. Cable mounting bracket 70 is bolted on one side of the housing 90, as shown (FIG. 7). Receiver unit 18 has two shift function elements therein, one a gearshift shaft 94 journalled for rotation between opposite sidewalls of the housing 90 and the other a rail selector sleeve 96 keyed to the shaft and free to slide longitudinally thereof. A transmission gear selector and actuator finger 98 projects downwardly from the sleeve 96 as an integral part thereof and serving as the coupling element between the transmission U and the receiver unit 18.

Shaft 94 projects outwardly beyond one sidewall of housing 90 and mounts the gearshifter crank arm 88 by way of a base collar 100 that is pinned to the shaft as shown.

Figure 2:
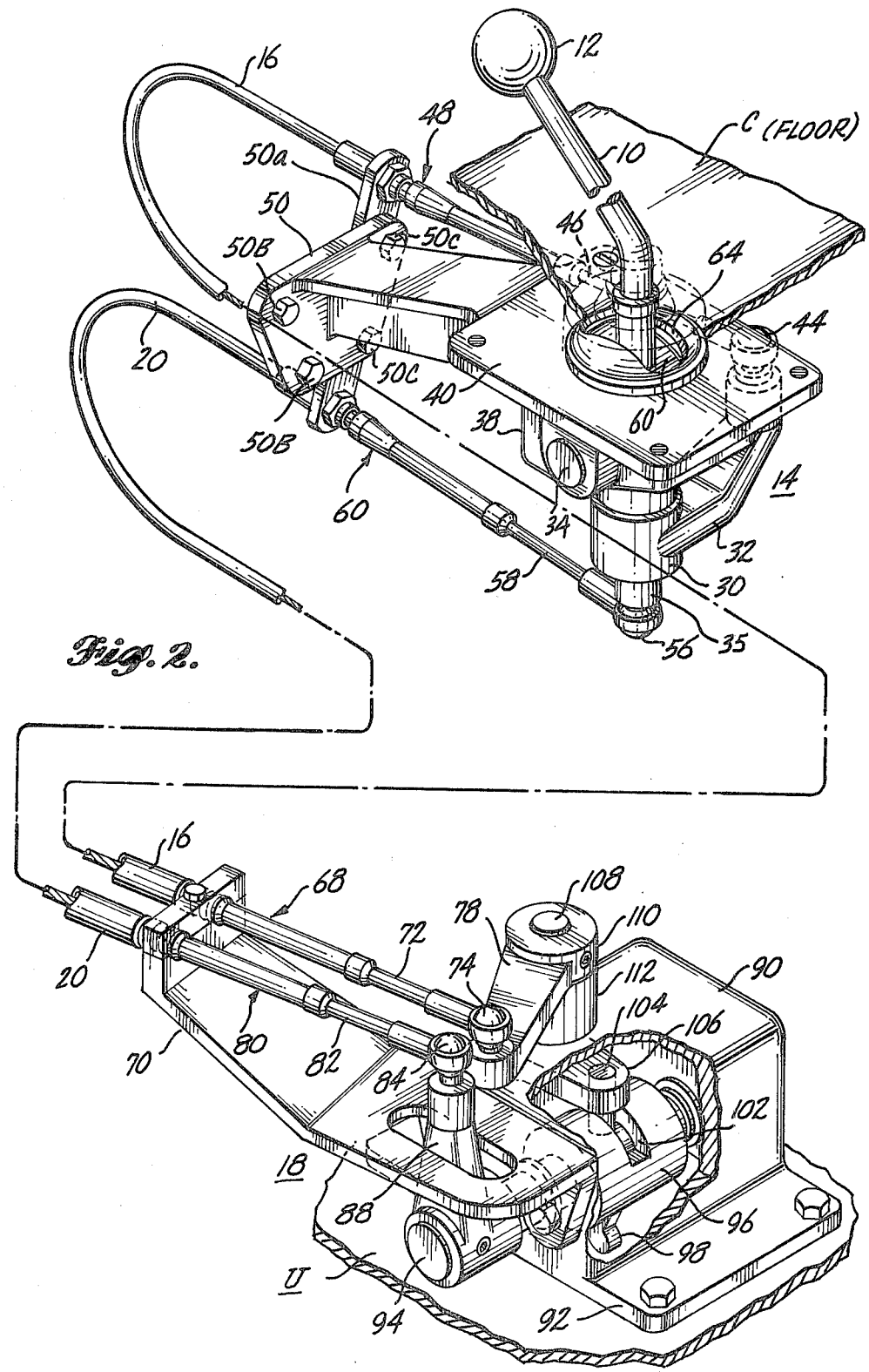
FIG. 2 is a perspective view of the mechanism, that portion in the upper part of the FIGURE representing the cab-mounted transmitter and that in the lower part of the FIGURE, the transmission-mounted receiver.
Figure 3:
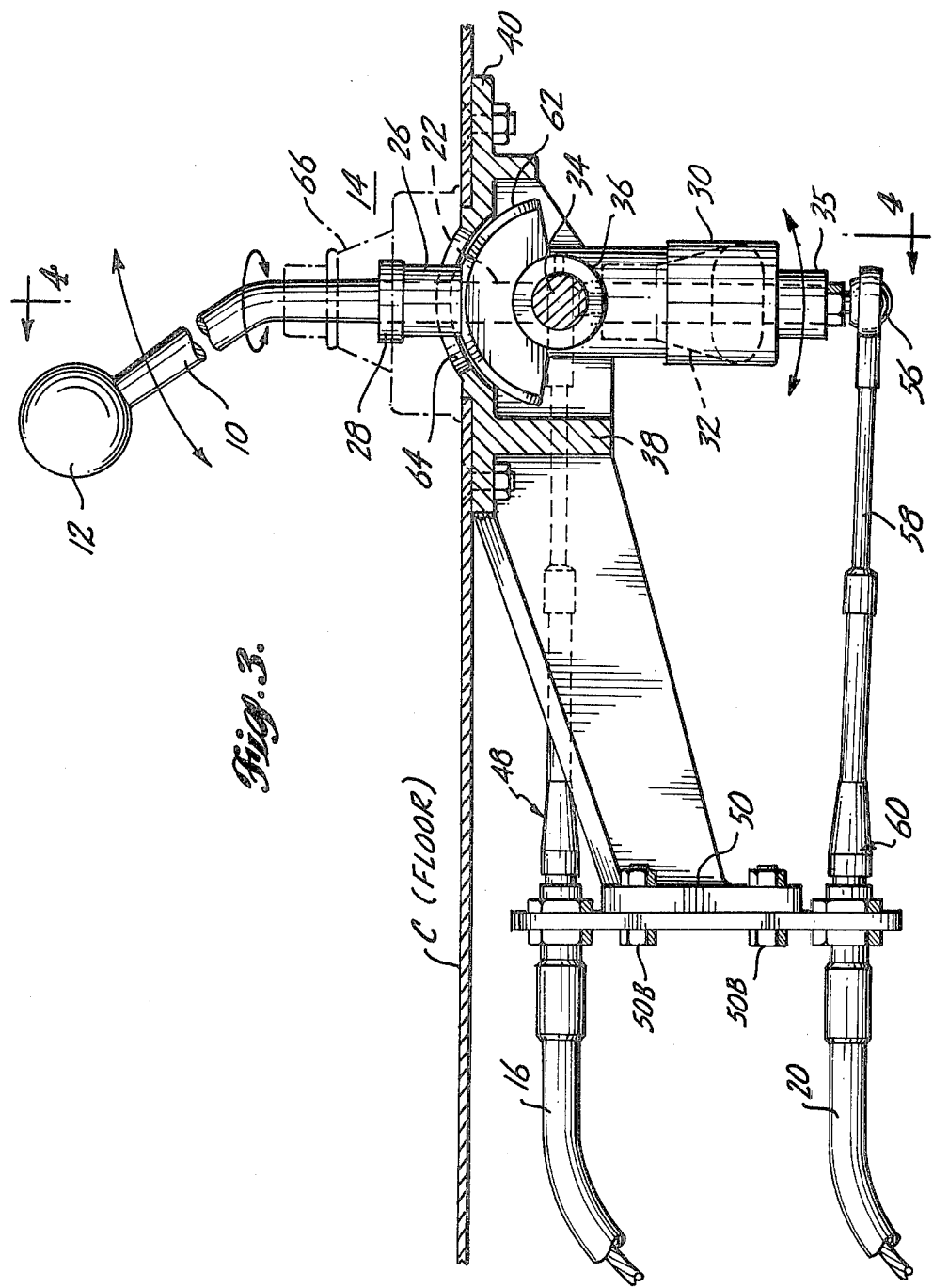
Figure 4:
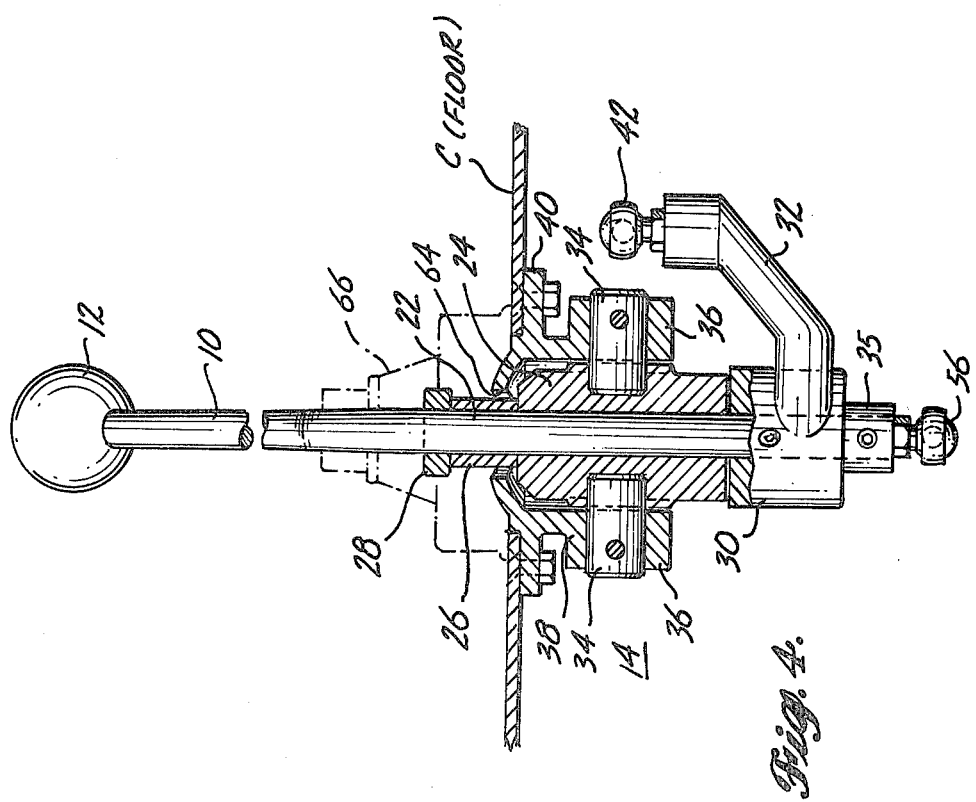
FIG. 4 is an end elevation of the transmitter unit section on line 4—4 in FIG. 3.
Figure 5:
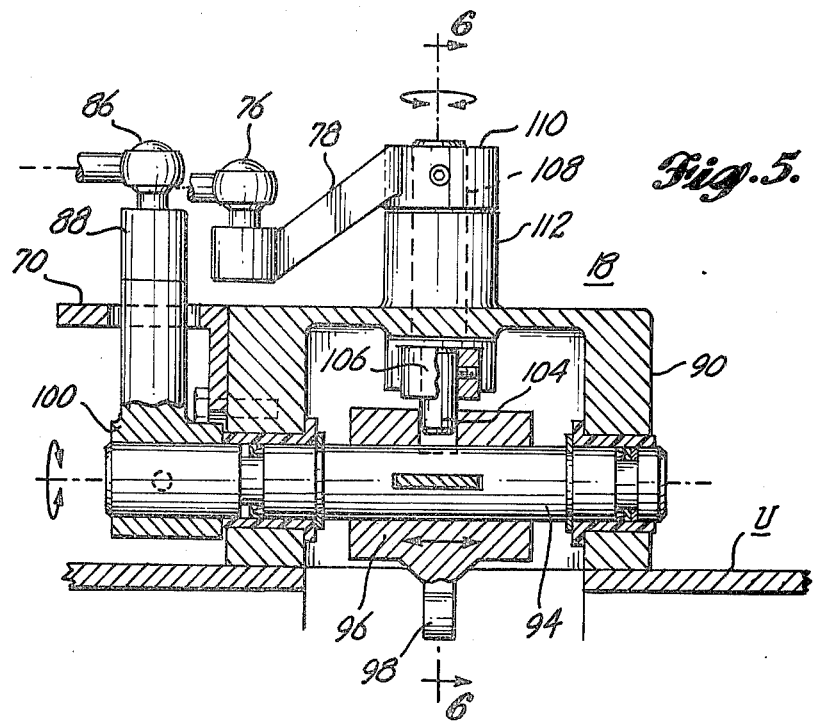
Figure 6:
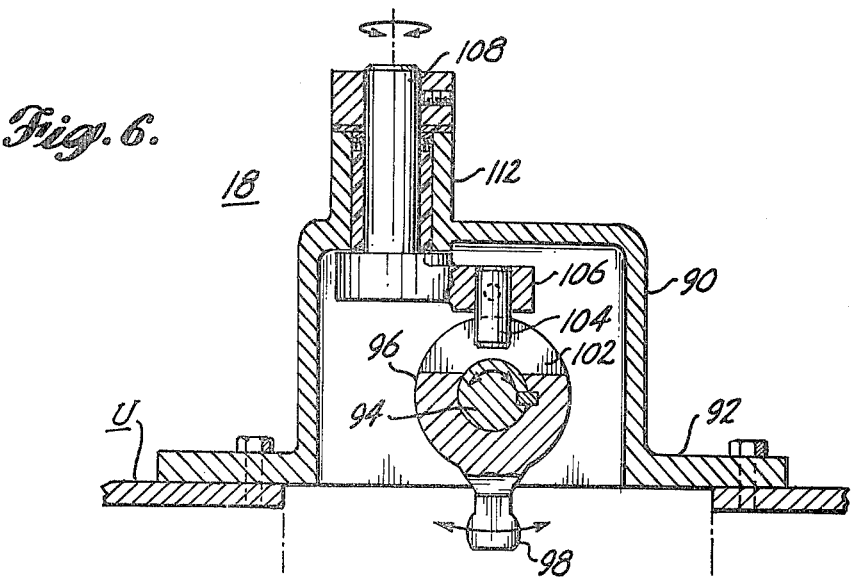
FIG. 6 is a sectioned side elevation taken on line 6—6 in FIG. 5.

The top side of sliding sleeve member 96 has a circumferentially extending arcuate slot intermediate its ends. Slidably received in that slot is the end of a pin 104 that projects downwardly from a crank arm 106 mounted on the lower end of an upright shaft 108. Shaft 108 mounts the crank arm 78 on its upper end by way of a base collar 110 pinned to such shaft. Crank arm 106 carrying the downwardly projecting pin 104 lies immediately beneath the top wall of the housing 80 and is pinned to such shaft 108, as shown. An upwardly projecting boss 120 on the top side of housing 90 positions the base of arm 78 above the level of the housing. Crank arm 78 extends radially from shaft 108 at right angles to crank arm 106. The arrangement is such that in the normal or neutral setting, the actuated crank arm 88 is upright and at right angles to slide rod 82 and crank arm 78 is at right angles to slide arm 72. When the crank arm 78 is swung one way or the other about its neutral position as shown in FIGS. 2 and 7, for example, crank arm 106 moves the coupling pin 108 generally lengthwise of the gearshifter shaft 94 so as to shift the sleeve 96 lengthwise of the shaft and thereby position the output coupling element 98 in operating relationship with a selected one of the transmission gear rails (not shown). This occurs without crank arm 88 moving appreciably. Thereafter, with the output or control finger operatively positioned with respect to the selected transmission rail, actuation of push-pull cable 20 rocks the actuator lever 88 one way or the other to swing the control member 98 one way or the other about the axis of shaft 94 and thereby causes engagement or disengagement of the transmission gear which corresponds to the previously selected station or rail setting. Thus, the receiver unit converts the two substantially independent modes of motion of the transmitter unit control member 22 into gear rail selection and gear engagement and disengagement, respectively.

In some installations, it is more convenient or necessary to meet spacing requirements to mount the cable support bracket 70 on the opposite side of the receiver unit housing 90. This can be easily accomplished by providing a second bracket of the opposite hand (i.e., a mirror version of bracket 70) and by providing tapped bolt holes in each side of the housing 90. When the opposite bracket mounting position is employed, the mounting strap 50A on transmitter unit 14 mounting bracket 50 is shifted to the opposite side of the bracket 50 and secured there by bolts 50B. Crank arm 32 is rotated through 180 degrees on the shaft 22 and keyed there.

In the first alternative embodiment of the transmitter unit 214 as shown schematically in FIG. 8, the push-pull transmission cables can be mounted to approach the unit from beneath and to permit actuation of the cable end rods by generally vertical motion. Shift control lever 210 projects upwardly from its mount on lever 216 supported by and keyed to shaft 218 on axis A—A. The latter makes an integral T-joint 220 with transverse shaft 222 journalled on axis B—B in stationary supports 224. The projecting end of shaft 218 is coupled to the upwardly extended end rod member of push-pull cable 226 by a ball-and-socket coupling 228. In its normal or neutral position shaft 218 is aligned with axis A—A, hence is perpendicular to the cable rod. An L-shaped arm 230 mounted on and keyed to shaft 218 extends in a generally horizontal plane to a ball-and-socket coupling 232 connecting the arm to the upwardly extended end rod member of push-pull cable 234. Coupling 232 is located on the axis B—B with shaft 218 in its centered or neutral position positioning the plane of arm 230 perpendicular to cable 234.

With the arrangement of FIG. 8, rocking of lever 210 about axis A—A pushes and pulls on the end rod member of cable 234 while cable 226 remains substantially fixed. Alternatively, rocking of lever 210 about axis B—B actuates cable 226 while the central member of cable 234 remains essentially stationary. Note that control lever 210 may extend straight upward from the transmitter unit 224 (i.e., it need not be angled in form nor have a portion serving as a shaft rotatable about its longitudinal axis as in the first embodiment), an advantage in some vehicle cab installations, for example, where lateral space above unit 214 is restricted. Note also that the unit of FIG. 8 permits mounting cables 234 and 226 on a suitable mount symbolized by fixed member 236 with the cables extending directly downward from the unit 214, opposite the extent of control lever 210. Here too is an advantage in a mounting application where there is not room nor accommodations for the push-pull cables to extend horizontally from unit 214 and to require horizontally directed actuation motion.

In the second alternative embodiment as depicted schematically in FIG. 9, control lever 310 also extends straight upward since it also relies upon rocking motion in mutually orthogonal planes in order to actuate the respective push-pull cables 312 and 314. In this second embodiment, however, push-pull cables 312 and 314 are permitted to extend from unit 316 initially in a horizontal direction, such as forwardly from the unit as in the first embodiment (FIGS. 1-6) and to be actuated by generally horizontal motion. In this instance, control lever 310 projects upwardly from its fixed mount on L-shaped lever 318 which in turn is rigidly supported by shaft 320. The latter makes an integral T-joint 322 with transverse shaft 324 journalled on axis B—B in stationary bearing supports 326. Still another shaft 328 integral with and projecting downward from the same T-junction 322 is connected at its lower end by a ball-and-socket joint 330 to the horizontally extended end rod member of push-pull cable 314. In the neutral or mid-position of angular motion of lever 310 about axis B—B, shaft 328 is upright and substantially perpendicular to cable 314.

Mounted rotatably on shaft 328 intermediate its ends beneath axis B—B is an L-shaped lever 332 which extends horizontally then upwardly to a ball-and-socket joint 334 located on the axis B—B. The ball-and-socket joint 334 couples the end of lever 332 to the extended end rod member of push-pull cable 312. Lever 318 projects downwardly below shaft 320 to connect with the end of a lever arm 332a which projects laterally from the base of lever 332. This connection, by which controlled rocking of lever 318 about shaft axis B—B produces rocking of shaft 328 about the same axis, and by which controlled rocking of lever 318 about shaft axis C—C produces angular motion of lever 332 about shaft axis A—A, is preferably formed by a longitudinal slot in the lower end of lever 318 and a ball or pin, slidably in the slot, on the end of lever arm 332a. With the lever 310 in its neutral position of angular motion about axis C—C (the axis of shaft 320) the upright plane of L-shaped arm 332 is perpendicular to the extent of the end rod member of cable 312.

In one mode of operation, angular motion of lever 310 about axis B—B actuates cable 314 while leaving cable 312 substantially unactuated. In the second mode of operation, angular motion of lever 310 about axis C—C actuates cable 312 while cable 314 remains substantially unactuated.

These and other variations and adaptations of the concept representing the features and combinations of features of this invention will be evident to those skilled in the art having reference to the above disclosure and illustration of the presently preferred embodiment illustrating the invention as applied to a cab-over engine truck installation. It will also be evident that the principles of the invention have other practical applications as well.

The embodiments of the invention in which an exclusive property or privilege is claimed are defined as follows:

1. Remote shifter apparatus comprising two separate elongated push-pull cables, a receiver unit having a first actuation element coupled to one end of one such cable and selectively movable by longitudinal actuation of said one cable into and from any of a plurality of receiver unit shifting positions, said receiver unit having a second actuation element coupled to one end of the other of said cables and selectively movable by longitudinal actuation of said other cable into and from receiver unit shifted position selected by said first actuation element, and a transmitter unit remote from said receiver unit comprising first and second lever arms having swinging ends respectively coupled to the respective other ends of the push-pull cables, means mounting the first lever arm for swinging about an axis extending generally lengthwise of said first lever arm, means mounting the second lever arm for swinging about an axis transverse to the length of the second lever arm and which passes substantially through the coupling between the first lever arm and the end of the push-pull cable coupled thereto, and an operating lever arm common to both said first and second lever arms, extending lengthwise of said second lever arm past said second mentioned axis thence extends transversely of the lengthwise extent of said second lever arm.

2. A dual linkage remote shifter apparatus comprising a transmitter unit and a receiver unit, said transmitter unit having a control member, guide means mounting said control member and guiding the same for rotary motion about a first axis in a first mode through a succession of control selection positions and further guiding said control member in each of said control selection positions for independent motion angular about a second axis in a second mode through a succession of control actuation positions, first and second elongated motion transmission links extending between said units, a first actuator member connected between the first link and the control member and movable by the control member in its first mode to move the first link lengthwise substantially without substantially thereby moving the second link, a second actuator member connected between the second link and the control member and movable by the control member in its second mode to move the second link lengthwise substantially without thereby moving the first link, said receiver unit having shifter means, and first and second actuated members respectively connected between said shifter means and the first and second links to actuate said shifter means in each of two modes substantially independently by respective movements of the said first and second links, said control member having a control arm extending transversely therefrom and operable to rotate the control member about said first axis and also operable to swing the control member about the second axis extending transversely to the first axis, said first actuator member comprising a first lever arm mounted on the control member at a mounting location on the control member offset from said second axis generally in the direction of said first axis, said first lever arm extending from the control member to a point of coupling with said first link at a location substantially on the second axis and offset transversely from said first axis and in a direction substantially transverse to the longitudinal extent of the first link, said second actuator comprising a second lever arm extending generally axially of the control member to be swung conjointly therewith about said transverse axis, said second lever arm extending to a point of coupling with the second link at a location offset from said second axis generally along said first axis and in a direction substantially transverse to the second link.

3. The shifter apparatus defined in claim 2, wherein the control member comprises an elongated shaft.

4. The apparatus defined in claim 2, wherein the control arm has a manual grip on the end thereof remote from the guide means.

5. The apparatus defined in either of claims 2 or 4, wherein the first and second links comprise respective movable members of flexible coaxial push-pull cables.

6. The apparatus defined in either of claims 2 or 4, wherein the shafter means comprise first and second shifter members coaxially interengaged for conjoint rotative motion about their common axis and for axial sliding motion of the first shifter member relative to the second shifter member, and wherein the first and second actuated members comprise levers interconnected between the respective shifter members and the first and second links, whereby one such lever shifts the first shifter lengthwise axially in relation to the second shifter member and whereby the second actuated member rocks the shifter members about their common axis into different actuation positions of such shifter members.

7. The apparatus defined in either of claims 2 or 4, wherein the shifter means comprise first and second shifter members coaxially interengaged for conjoint rotative motion about their common axis and for axial sliding motion of the first shifter member relative to the second shifter member, and wherein the first and second actuated members comprise levers interconnected between the respective shifter members and the first and second links, whereby one such lever shifts the first shifter member lengthwise axially in relation to the second shifter member and whereby the second actuated member rocks the shifter members about their common axis into different actuation positions of such shifter members, and wherein the first and second links comprise the movable members of the respective flexible, coaxial push-pull cables.

* * * * *